(12) United States Patent
Speed et al.

(10) Patent No.: US 6,490,405 B1
(45) Date of Patent: Dec. 3, 2002

(54) TIMESTAMP MODIFICATION FOR SEAMLESS BRANCHING

(75) Inventors: Robin Speed, Kirkland, WA (US); William C. Powell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/106,444

(22) Filed: Jun. 29, 1998

(51) Int. Cl.[7] .............................. H04N 5/91; H04N 5/85; H04N 8/781

(52) U.S. Cl. ........................ 386/65; 386/124; 386/125

(58) Field of Search ............................. 386/65, 96, 98, 386/99, 104, 105, 106, 124, 125, 126, 39, 40, 45, 109, 111, 112, 66, 84; H04N 5/91, 5/85, 5/781

(56) References Cited

U.S. PATENT DOCUMENTS 6,167,189 A * 12/2000 Taira et al.
6,185,365 B1 * 2/2001 Murase et al.

* cited by examiner

Primary Examiner—Robert Chevalier
(74) Attorney, Agent, or Firm—Lee & Hayes, PLLC (57) ABSTRACT

The modification of timestamps of streams of data packets for seamless branching is disclosed. In one aspect of the invention, a computerized system has a plurality of multi-media play devices, and a multimedia read device. Each play device receives and plays data intended for that device. The multimedia read device reads a stream of packets of data, decodes the packets into data, and sends the data to a corresponding play device at appropriate times. The appropriate time is based on relative timestamps accounting for accumulated time gaps resulting from branches within the stream. The invention has applications including digital video disc (DVD) playback.

57 Claims, 4 Drawing Sheets

TIMESTAMP MODIFICATION FOR SEAMLESS BRANCHING

FIELD OF THE INVENTION

This invention relates generally to the decoding of streams of packets, where each packet has a corresponding substream, and more particularly to the modification of timestamps of such streams for seamless branching.

BACKGROUND OF THE INVENTION

With the advent and increasing popularity of digital-video-disc (DVD) and compact-disc read-only-memory (CD-ROM) technology, as well as usage of the Internet, the viewing of multimedia that is stored as a stream of data packets has also become very popular. For example, with respect to DVD technology, more and more movies and other content are becoming available on DVD's, which are playable on dedicated DVD players intended for integration with a home stereo system, as well as on DVD players incorporated into a home personal computer (PC) system.

DVD's, and other media that store stream of packets representing multimedia data, typically are such that each packet is associated with a corresponding substream, where each substream is intended for playback on a different device. For example, a DVD might have two substreams, an audio substream and a video substream. The audio substream contains packets of data intended for output to a device such as an amplifier coupled to one or more speakers, so that the audio may be heard. The video substream contains packets of data intended for output to a device such as a television or monitor, so that the video may be seen.

For such streaming data packets that are each associated with corresponding substreams, such that each different substream of data packets is intended for ultimate output and playback on a different device, the synchronization of the playback of the different substreams of data packets is crucial. For streaming data packets such as that stored on DVD's, timestamps exist within the stream, so that the DVD player knows to output the data within a given packet to the device associated with the substream for that packet at the appropriate time. However, because the stream of packets may also contain branches to other packets within the stream, large jumps or breaks may occur within the sequence of timestamps. This is because the timestamps are typically preauthored into the stream of packets stored on a given DVD.

A DVD player, or similar device, must therefore accommodate the synchronization of substreams of data packets. According to the prior art, one manner by which this synchronization is accomplished includes two timers with a fixed offset corresponding to the size of the time gap when a time gap is encountered. Each stream decoder is separately switched to the second timer (the one corresponding to time after the time gap) at the precise moment when it is deemed to have presented all its data for the time before the time gap. When all streams are switched to the second timer the first timer is updated by the amount of the time gap so that both timers are the same and the stream decoders are all switched back to using the first timer, ready for any subsequent time gaps. (The typical DVD player or similar device has a main decoder that determines the substream type of each packet, and then sends the packet to the appropriate substream decoder for such packets, the substream decoder then decoding the data from the packet and sending it to the appropriate audio or video device as output.) However, as those of ordinary skill within the art can appreciate, synchronization among the timers for the substream decoders can be quite complex, especially where there are three or more substream decoders, and may require sophisticated timing circuitry within the DVD player.

In addition the prior art is not suitable when a rapid sequence of time gaps is encountered because more clocks might then be required. This means that this solution may be prone to synchronization errors should something go awry—such that the video playback of a DVD, for example, does not "line up" with the audio playback. This could occur, for example, if a decoder failed to deliver its data before it is switched to the second clock which (if the clock was switching to an earlier time) would result in a freeze of the video of length roughly equal to the time gap which may be an hour or more while the decoder waited for the new clock to reach the time corresponding to the timestamp on its data.

Therefore, there is a need for the synchronization of substreams of data packets intended for playback on different types of devices, that does not require the use of separate timers for before and after a timestamp gap. Such a solution should not require complex or sophisticated timing circuitry, and not be prone to synchronization errors that may occur with such circuitry. Such a solution should thus prevent large breaks or gaps from occurring within the playback of streams of data packets that may result when branching occurs within such streams.

SUMMARY OF THE INVENTION

The above-mentioned shortcomings, disadvantages and problems are addressed by the present invention, which will be understood by reading and studying the following specification. One aspect of the invention is a computerized system having a plurality of multimedia play devices (e.g., a television, monitor, or amplifier coupled to one or more speakers), and a multimedia read device (e.g., a DVD player). Each play device receives and plays data intended for that device. The multimedia read device reads a stream of data packets(e.g., as stored on a DVD), decodes the packets into data, and sends the data to a corresponding play device at the appropriate times. The appropriate time is based on relative timestamps accounting for accumulated time gaps resulting from branches within the stream.

For example, a multimedia read device, such as a DVD player, may have at least a stream decoder and two or more substream decoders. The stream decoder looks at each packet of data to determine to which substream decoder it should be sent. When the packet of data is sent, a relative timestamp is sent in conjunction therewith, instead of an absolute timestamp from the stream. This relative timestamp may be calculated as Trel=Tabs−Tacc, where Trel is the relative timestamp, Tabs is the absolute timestamp, and Tacc is the accumulated time gaps resulting from branches within the stream. When a branch is reached within a stream, Tacc is incremented by Tto−Tfrom, where Tto is the absolute timestamp immediately after the branch, and Tfrom is the absolute timestamp at the branch.

In this manner, the invention provides for the synchronization of substreams of data packets without utilization of separate timers for each substream decoder of a multimedia read device. Rather, a relative timestamp is passed from the main stream decoder to the substream decoders. Large jumps or breaks within the absolute timestamps as a result of branches within the stream are thus prevented, and not propagated to the substream decoders. It is believed that the invention also is not prone to synchronization errors, as may occur in the prior art solution of utilizing separate timers for each substream decoder.

The present invention includes computerized methods, systems, computers, multimedia read devices and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a computerized system of one embodiment of the invention is presented. In the third section, a computerized general method in accordance with an embodiment of the invention is provided. In the fourth section, a computerized method in accordance with an embodiment of the invention, and that is particular to a DVD application, is presented. Finally, in the fifth section, a conclusion of the detailed description is provided.

Hardware and Operating Environment

Figure 1:
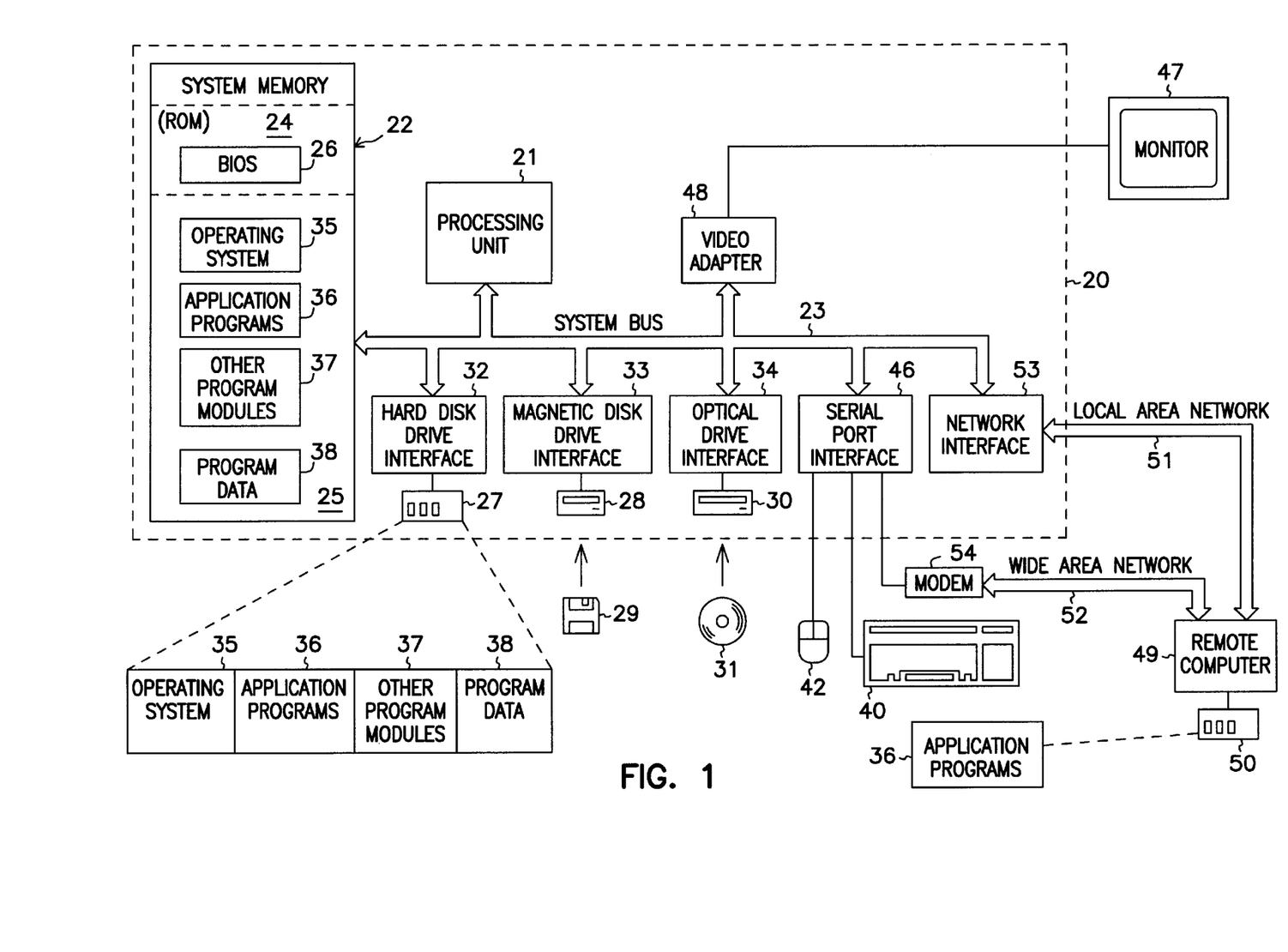
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
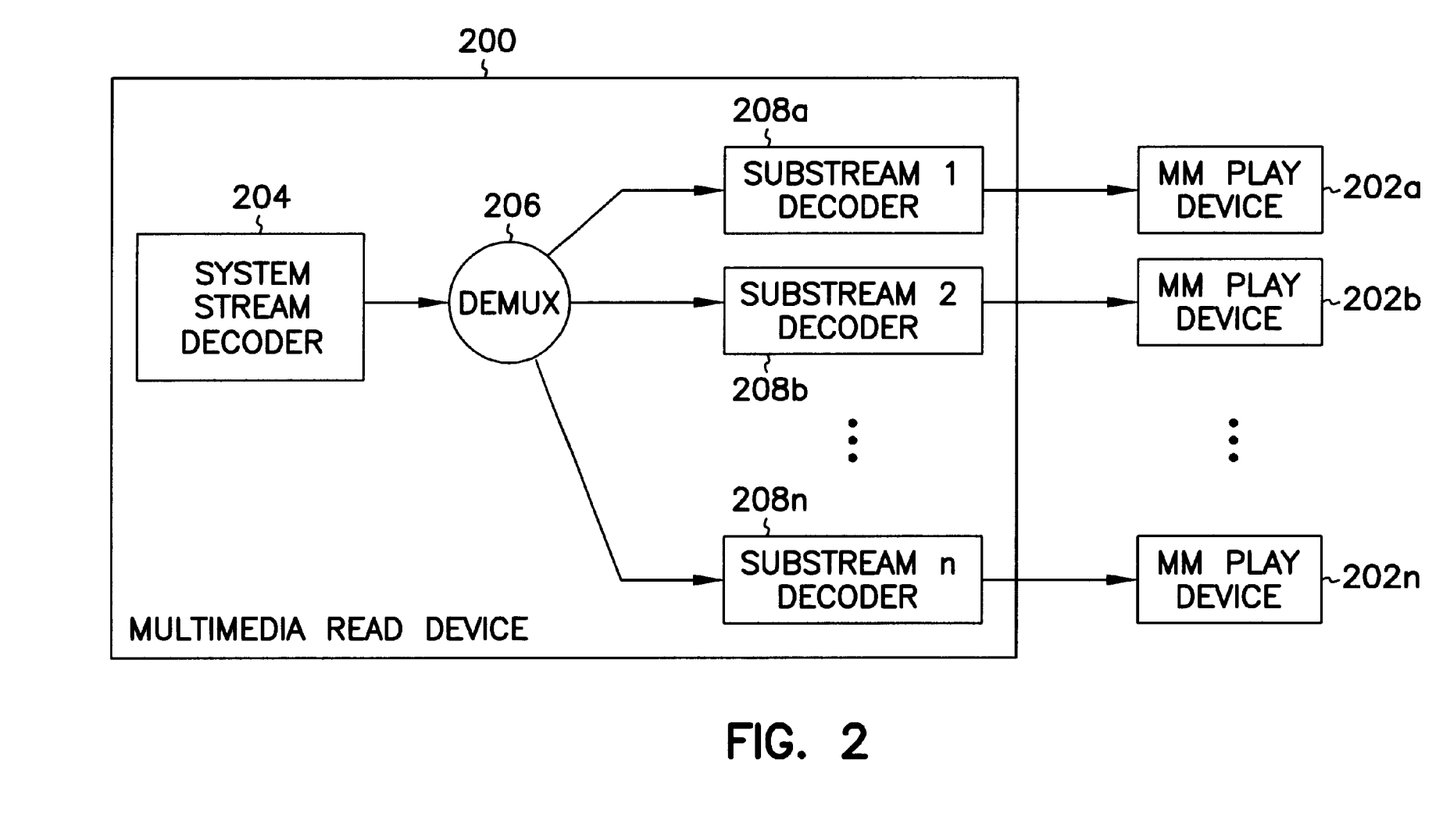
FIG. 2 shows a diagram of a computerized system in accordance with an embodiment of the invention.

A description of a computerized system according to an embodiment of the invention is provided by reference to FIG. 2. In the computerized system of FIG. 2, multimedia read device 200 is coupled operatively to multimedia play devices 202a, 202b, . . . , 202n. The multimedia read device reads a stream of data packets (not shown in FIG. 2), where each packet is associated with a corresponding substream, and sends the data to a multimedia play device corresponding to the substream at the appropriate time. The appropriate time is based on relative timestamps accounting for accumulated time gaps resulting from branches within the stream. The invention is not limited to a particular type of read device. One such device includes a digital video disc (DVD) player. Each of the multimedia play devices receives and plays data intended for the device. The invention is not limited to a particular number or type of such devices. Such play devices include televisions, monitors, other types of video displays devices, and audio amplifiers coupled to one or more speakers and other types of audio devices.

Not shown in FIG. 2 is that the computerized system may include or be a part of a computer, such as that which is shown in and has been described in conjunction with FIG. 1. That is, multimedia read device 200 may be a part of the computer, or coupled thereto. For example, the computer may have installed therein an internal DVD player, as known within the art, within a 5.25" bay of the computer. For further example, the computer may have coupled thereto an external DVD player, as also known within the art, to a Universal Serial Bus (USB), PCMCIA card slot (also known as a PC Card slot), a parallel port, or a serial port of the computer. In addition, multimedia read device 200 may be a component within a stereo system, as also known within the art.

Multimedia read device 200 comprises system stream decoder 204, demultiplexer 206, and substream decoders 208a, 208b, . . . , 208n. The stream decoder 204 decodes the stream of packets, and sends each packet to demultiplexer 206 with a relative timestamp. The relative timestamp accounts for any and all accumulated time gaps resulting from branches within the packet stream. Desirably, decoder 204 itself calculates this relative timestamp. Optionally, in an embodiment of the invention in which multimedia read device 200 is part of or coupled to a computer, a computer program running on the computer (i.e., executed from a computer-readable medium such as a random-access memory by the processor of the computer) may calculate the relative timestamp to maintain the appropriate times at which data is sent to the multimedia play devices. In such instance, the computer program may also be stored on another computer-readable medium, such as a read-only memory, a floppy disk, or a compact-disc read-only-memory (CD-ROM).

The relative timestamp is relative as compared to the absolute timestamp that is typically preauthored into the packet stream itself. By passing a relative timestamp as opposed to an absolute timestamp, the stream decoder provides for synchronization of the packet substreams, which is an advantage of the invention. The invention is not particularly limited to the manner by which relative timestamps are calculated; however, in one embodiment, the relative timestamps are calculated in accordance with the method of FIG. 3, which is described in a following section of the detailed description.

Demultiplexer 206 receives the packets from stream decoder 204, and sends each packet, including a relative timestamp as received from decoder 204, to the one of substream decoders 208a, 208b, . . . , 208n that corresponds to the substream of the packet. Thus, each of substream decoders 208a, 208b, . . . , 208n corresponds to a different packet substream, such as an audio substream, a video substream, etc. The invention is not particularly limited to any number or type of substream decoders. Each substream decoder receives packets of its corresponding substream from demultiplexer 206, including relative timestamps, decodes the data from the packets, and sends the data to a corresponding play device 202a, 202b, . . . , or 202n at the appropriate time. That is, when the system clock is equal to the relative time indicated in the relative timestamp for a given packet, the data within that packet is decoded and sent to a corresponding multimedia play device as output.

Thus, the operation of the computerized system of FIG. 2 is as follows. Stream decoder 204 reads a stream of data packets coming from a source such as a DVD. The stream, besides including data packets, also includes absolute timestamps preauthored into the source (in one embodiment). Decoder 204 desirably determines a relative timestamp accounting for accumulated time gaps resulting from branches within the stream, so that the data within the packets are played and/or decoded at the appropriate time. Demultiplexer 206 receives packets and relative timestamps from decoder 204, and sends the packets with their relative timestamps to the appropriate substream decoder 208a, 208b, . . . , 208n depending on the type of substream of the packets. For example, where there are two substream decoders 208a and 208b, packets of an audio substream may be sent to decoder 208a, while packets of a video substream may be sent to decoder 208b. At the appropriate time, based on the relative timestamps calculated by decoder 204, substream decoders 208a, 208b, . . . , 208n decode and output the data contained in their packets to the multimedia play devices 202a, 202b, . . . , 202n to which they are coupled. Because of the relative timestamps, then, the playback on the play devices of the data decoded by the substream decoders is synchronized.

A description of a computerized system in accordance with an embodiment of the invention has been provided. The computerized system has been described in relation to a DVD-stored stream of data packets. However, those of ordinary skill within the art will appreciate that the invention is not limited to DVD applications, and is amenable to any stream of data packets in accordance with which the invention may be used.

Method

Figure 3:
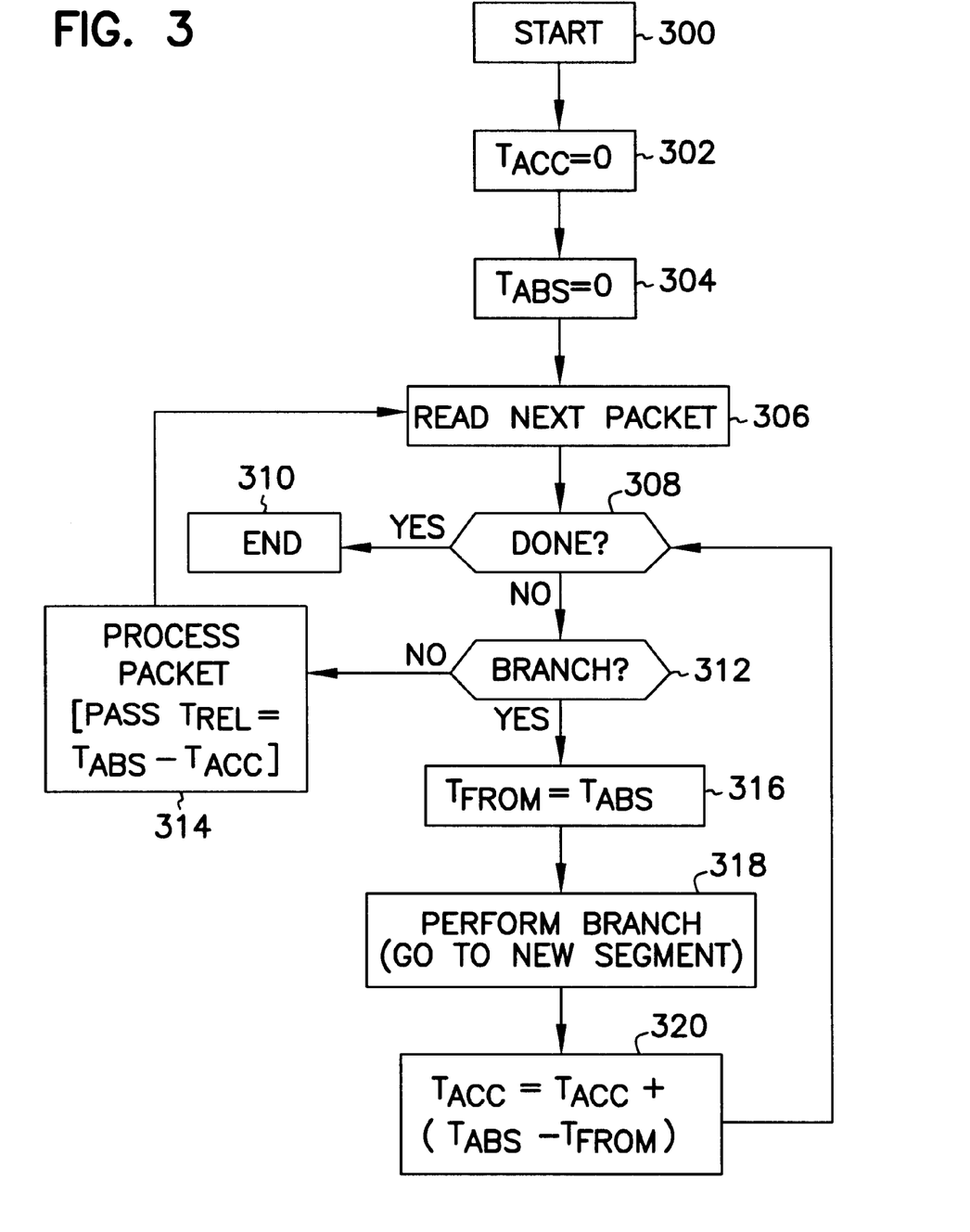
FIG. 3 shows a flowchart of a computerized method in accordance with an embodiment of the invention; and, FIG. 4 shows a flowchart of a computerized method for a specific DVD application, in accordance with an embodiment of the invention.

In the previous section, a description of a system according to an embodiment of the invention was described. In this section, a method according to an embodiment of the invention is described, in reference to FIG. 3. The method may be performed by the system of the previous section, such as by the multimedia read device (e.g., the stream decoder thereof), or a computer in conjunction with which such a read device is being utilized. The method is desirably a computer program stored on a computer-readable medium, such as a memory (random-access or read-only memory, for instance), a floppy disk, or a compact-disc read-only-memory (CD-ROM). The description in this section enables one of ordinary skill within the art to construct a computer program encompassing such a computerized method. The method of FIG. 3 is a generalized method according to one embodiment of the invention, and may be particularized in accordance with a particular type of data stream, as those of ordinary skill within the art can appreciate. For example, a specific method for use with DVD is described in the next section of the detailed description.

Referring now to FIG. 3, from the start in step 300, control proceeds to step 302 and then to step 304. In steps 302 and 304, initialization is performed. In step 302, the variable Tacc, representing the accumulated time gaps resulting from branches with a data packet stream, is reset to zero. In step 304, the variable Tabs, representing an absolute timestamp, is also reset to zero. Note that the absolute timestamp may be reset to some value other than zero, depending on whether processing (and playback) of the data stream is starting from the beginning of the data packet stream, or at some point away from the beginning of the data packet stream. The invention is not so limited.

In step 306, the next (first) packet is read, such that the variable Tabs may be incremented in accordance with the reading of this packet. However, the variable Tabs may also not be incremented with each new packet, as those of ordinary skill within the art can appreciate. If the end of the data packet stream has been reached (e.g., the end of a DVD has been reached), then the method proceeds from step 308 to step 310, and the method ends. If a branch does not occur, control proceeds from step 312 to step 314. In step 314, the packet read in step 306 is processed. A relative timestamp represented by the variable Trel may be calculated in accordance with the formula Trel=Tabs−Tacc, to take into account any accumulated time gaps resulting from branches within the stream, if the packet read in step 306 corresponds to an incremented Tabs (otherwise a new Trel is not calculated). This new relative timestamp (or the old relative timestamp, if a new one was not calculated) is then passed. For example, the packet, along with the relative timestamp, may be provided as an output to a demultiplexer, for further direction to an appropriate substream decoder, as has been previously described in conjunction with FIG. 2. Control then proceeds back to step 306, where the next packet is read, and the variable Tabs may be incremented, and the method continues as has been described.

If, however, a branch did occur in step 312, control proceeds to step 316. In step 316, the variable Tfrom is set to Tabs. The variable Tfrom thus represents the absolute time stamp at the detected branch. In step 318, the branch is actually performed (i.e., there is a jump to a new segment within the stream of packets), and the first packet within the new segment is read. Tabs also changes, to reflect that a new absolute timestamp is now being referenced. In step 320, the variable Tacc is incremented by (Tabs−Tfrom), to take into account the time gap that has resulted from the branch just performed. The amount the accumulated time is incremented is the amount of time between the new position referenced by Tabs (after the branch), and the position referenced by Tfrom (at the branch). Thus, the amount of time advanced within the packet stream is accumulated within Tacc. From step 320, control proceeds back to step 308, where the packet stream is again examined for branches or the end of the stream, or the packet just read is processed as has been described.

Thus, the method of FIG. 3, via the calculations Trel=Tabs−Tacc and Tacc=Tacc+(Tabs−Tfrom), provide for the synchronization of decoding and playback of data contained within the packets of the stream, by accounting for accumulated time gaps that may result when branches are encountered within the stream. By passing the relative timestamp referenced by Trel, instead of the absolute timestamp referenced by Tabs, the method ensures that the accumulated time represented by Tacc is accounted for. The accumulated time represented by Tacc is incremented by time gaps resulting from branches within the stream as the branches are encountered. Such calculations of relative time and accumulated time are advantages of the invention.

A method according to an embodiment of the invention has been described. The method has been described as being performed within or by a system as has been shown in and previously described in conjunction with FIG. 2. However, the method of FIG. 3 is not so limited, as those of ordinary skill within the art can appreciate.

Specific Method for DVD

In the previous section of the detailed description, a general method according to an embodiment of the invention was described. In this section, a particular method according to an embodiment of the invention suitable for use with DVD data streams is presented. Those of ordinary skill within the art will appreciate that the invention is not limited to DVD applications, however, and that the general method of FIG. 3 described in the previous section can be applied to any of a number of stream data types.

Figure 4:
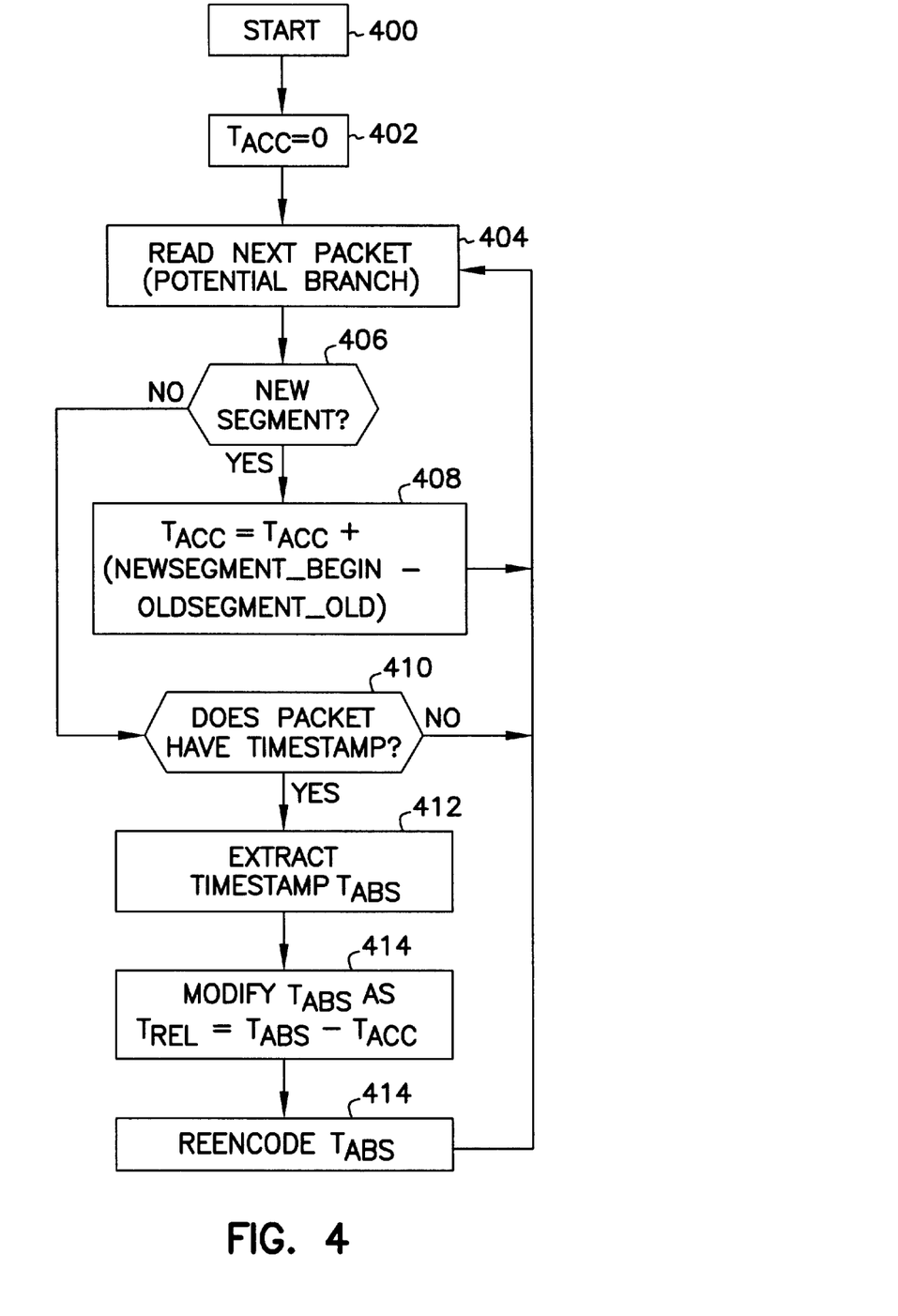

Referring now to FIG. 4, from the start in step 400, control proceeds to step 402, in which the variable Tacc, representing the accumulated time gaps resulting from branches within a DVD packet stream (i.e., branches between different segments of the DVD packet stream) is reset to zero. In step 404, a DVD packet is read, or a branch within the stream is detected. The packet may be the first packet of a new segment of packets within the stream (for example, after a branch has occurred, or when reading of the DVD packet stream first begins), or it may be a packet other than the first packet of a segment of packets within the stream, such that at least one packet of the segment has already been read.

In step 406, it is checked whether there has been a branch to a new segment. If the segment is new, then in step 408, the variable Tacc is incremented by the time gap between the end of the old (previous) segment and the beginning of the new segment. In the case where the reading of the data stream has only immediately just begun, the end of the old (previous) segment is assumed to be zero, as those of ordinary skill within the art can understand. Data within the DVD stream indicates the timestamps for the beginning and end of all segments of packets, such that the time gap by which Tacc is incremented does not need to be specifically computed as was described in the method of FIG. 3. However, those of ordinary skill in the art can appreciate that the particular case of FIG. 4 relating to DVD streams is nevertheless inclusive within the general case of FIG. 3. The method then goes from step 410 back to step 404, to read the next packet (viz., the first packet of the new segment).

If a new segment was not found in step 406, the data packet is checked in step 410 as to whether it includes or corresponds to a timestamp Tabs (the timestamp, for example, may not be within the packet itself). If it does not, the next packet is read, reverting control back to step 404. However, if the data packet does include or correspond to a timestamp Tabs, then in step 412 the timestamp is extracted, computed or read, as known within the art. In step 414 the timestamp Tabs is modified as Trel=Tabs minus Tacc. This new timestamp is reencoded in step 416, and passed to the appropriate substream decoder. Control then proceeds back to step 404, to read the next packet. Those of ordinary skill within the art can of course appreciate that if the last packet has been read, the method of FIG. 4 ends, but this is not shown explicitly in FIG. 4.

A particular method for application of an embodiment of the invention to DVD has been described. This method is an application of the general method according to an embodiment of the invention that was described in the previous section of the detailed description.

Conclusion

Timestamp modification for seamless branching within a packet data stream has been described. In particular both a method and a system according to embodiments of the invention have been described. A specific method according to one embodiment of the invention for application to DVD has also been described.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, embodiments of the invention have been described where the variable Tabs is inherent within the data stream itself. However, the invention is not so limited. For example, the Tabs variable may not be in the stream—and thus externally computed—or it may not be necessarily at the point within the stream at which the packet corresponding to a given Tabs variable corresponds is. Therefore, it is manifestly intended that this invention be limited only by the following claims and equivalents thereof.

We claim:

1. A computerized system comprising:

a plurality of multimedia play devices, each device receiving and playing data intended for the device; and, a multimedia read device reading a stream of packets, decoding the packets into data, and sending the data to a corresponding multimedia play device at appropriate times, the appropriate times being based on relative timestamps accounting for accumulated time gaps resulting from branches within the stream.

2. The computerized system of claim 1, wherein each packet of the stream has a corresponding substream, and the multimedia read device comprises:

a plurality of substream decoders, each substream decoder receiving packets of a corresponding substream, decoding the packets into data and sending the data to a corresponding multimedia play device at the appropriate times;

a demultiplexer receiving packets and sending each packet, including a relative timestamp, to the substream decoder corresponding to the substream of the packet; and, a stream decoder decoding the stream of the packets, and sending each packet to the demultiplexer with a relative timestamp.

3. The computerized system of claim 1, wherein the relative timestamps are calculated by the multimedia read device according to the formula:

$$Trel=Tabs-Tacc,$$

where Trel is a relative time, Tabs is an absolute time as discerned from an absolute timestamp from the stream, and Tacc is the accumulated time gaps resulting from branches within the stream.

4. The computerized system of claim 1, wherein the accumulated time gaps resulting from branches within the stream are calculated by the multimedia read device according to the formula:

$$Tacc=Tacc+(Tabs-Tfrom),$$

where Tacc is the accumulated time gaps resulting from branches within the stream, Tabs is an absolute time as discerned from an absolute timestamp from the stream immediately after a branch, and Tfrom is an absolute time as discerned from an absolute timestamp from the stream at the branch.

5. The computerized system of claim 1, wherein the accumulated time gaps resulting from branches within the stream are calculated by the multimedia read device according to the formula:

$$Tacc=Tacc+(Tnewsegmentbegin-Toldsegmentend),$$

where Tacc is the accumulated time gaps resulting from branches within the stream, Tnewsegmentbegin is an absolute time as discerned from an absolute timestamp from the stream immediately after a branch, and Toldsegmentend is an absolute time as discerned from an absolute timestamp from the stream at the branch.

6. The computerized system of claim 1, wherein at least one of the plurality of multimedia play device is selected from the group of multimedia play devices comprising: a video display device, and an audio device.

7. The computerized system of claim 6, wherein the video display device comprises a monitor.

8. The computerized system of claim 6, wherein the audio device comprises an amplifier coupled to at least one speaker.

9. The computerized system of claim 1, wherein the multimedia read device comprises a digital-video disc (DVD) player.

10. A multimedia read device for reading a stream of packets, each packet having a corresponding substream, comprising:
   a plurality of substream decoders, each substream decoder receiving packets of a corresponding substream, decoding the packets into data and providing the data as output at the appropriate times;
   a demultiplexer receiving packets and sending each packet, including a relative timestamp, to the substream decoder corresponding to the substream of the packet; and,
   a stream decoder decoding the stream of the packets, and sending each packet to the demultiplexer with a relative timestamp,
   wherein the appropriate times are based on relative timestamps accounting for accumulated time gaps resulting from branches within the stream.

11. The multimedia read device of claim 10, wherein the relative timestamps are calculated by the stream decoder according to the formula:

$$Trel = Tabs - Tacc,$$

where Trel is a relative time, Tabs is an absolute time as discerned from an absolute timestamp from the stream, and Tacc is the accumulated time gaps resulting from branches within the stream.

12. The multimedia read device of claim 10, wherein the accumulated time gaps resulting from branches within the stream are calculated by the stream decoder according to the formula:

$$Tacc = Tacc + (Tabs - Tfrom),$$

where Tacc is the accumulated time gaps resulting from branches within the stream, Tabs is an absolute time as discerned from an absolute timestamp from the stream immediately after a branch, and Tfrom is an absolute time as discerned from an absolute timestamp from the stream at the branch.

13. The multimedia read device of claim 10, wherein the stream of packets is read by the multimedia read device from a digital video disc (DVD).

14. A computer comprising:
   a processor;
   a computer-readable medium;
   a multimedia read device reading a stream of packets, decoding the packets into data, and providing the data as output at the appropriate times;
   a program executed by the processor from the medium to maintain the appropriate times based on relative timestamps accounting for accumulated time gaps resulting from branches within the stream.

15. The computer of claim 14, wherein the relative timestamps are calculated by the program according to the formula:

$$Trel = Tabs - Tacc,$$

where Trel is a relative time, Tabs is an absolute time as discerned from an absolute timestamp from the stream, and Tacc is the accumulated time gaps resulting from branches within the stream.

16. The computer of claim 14, wherein the accumulated time gaps resulting from branches within the stream are calculated by the program according to the formula:

$$Tacc = Tacc + (Tabs - Tfrom),$$

where Tacc is the accumulated time gaps resulting from branches within the stream, Tabs is an absolute time as discerned from an absolute timestamp from the stream immediately after a branch, and Tfrom is an absolute time as discerned from an absolute timestamp from the stream at the branch.

17. The computer of claim 14, wherein the computer-readable medium comprises a memory.

18. The computer of claim 14, wherein the multimedia read device comprises a digital video disc (DVD) player.

19. A computerized method for processing a stream of packets, each packet having a corresponding substream, comprising:
   determining whether the stream at an absolute timestamp comprises a branch;
   upon determining that the stream at the absolute timestamp comprises information other than a branch,
      reading a packet within the stream at the absolute timestamp,
      calculating a relative time as the absolute time minus an accumulated time based on accumulated time gaps resulting from branches within the stream, and,
      providing the packet, along with the relative time, as an output; and,
   upon determining that the stream at the absolute timestamp comprises a branch,
      setting a from-time as the absolute time,
      performing the branch, such that the absolute time is advanced;
      incrementing the accumulated time by the absolute time, as advanced, minus the from-time.

20. The computerized method of claim 19, wherein the stream of packets is read from a digital video disc (DVD).

21. A computer-readable medium having computer-executable instructions that when executed, perform actions comprising reading a stream of packets, decoding the packets into data, and providing the data as output at the appropriate times, the computer-executable instructions maintaining the appropriate times based on relative timestamps accounting for accumulated time gaps resulting from branches within the stream.

22. The computer-readable medium of claim 21, wherein the relative timestamps are calculated by the computer-executable instructions according to the formula:

$$Trel = Tabs - Tacc,$$

where Trel is a relative time, Tabs is an absolute time as discerned from an absolute timestamp from the stream, and Tacc is the accumulated time gaps resulting from branches within the stream.

23. The computer-readable medium of claim 21, wherein the accumulated time gaps resulting from branches within the stream are calculated by the computer-executable instructions according to the formula:

$$Tacc=Tacc+(Tabs-Tfrom),$$

where Tacc is the accumulated time gaps resulting from branches within the stream, Tabs is an Absolute time as discerned from an absolute timestamp from the stream immediately after a branch, and Tfrom is an absolute time as discerned from an absolute timestamp from the stream at the branch.

24. The computer-readable medium of claim 21, wherein the medium is selected from the group of mediums consisting of: a floppy disk, a compact-disc read-only-memory (CD-ROM), and a memory.

25. A computerized method for processing a stream of DVD packets, comprising:
   reading a packet within the stream;
   determining whether the packet is part of a new segment within the stream;
   upon determining that the packet is part of a new segment within the stream,
      calculating an accumulated time; determining whether the packet has a timestamp; and, upon determining that the packet has a timestamp,
      extracting the timestamp from the packet,
      modifying the timestamp to account for the accumulated time, and
      reencoding the timestamp as modified within the packet.

26. The computerized method of claim 25, wherein the stream of packets is read from a digital video disc (DVD).

27. The computerized method of claim 25, further comprising passing the reencoded timestamp to a substream decoder.

28. The computerized method of claim 25, wherein modifying the timestamp to account for the accumulated time further comprises calculating relative timestamps according to the formula:

$$Trel=Tabs-Tacc,$$

where Trel is a relative time, Tabs is an absolute time as discerned from an absolute timestamp from the stream, and Tacc is the accumulated time gaps resulting from branches within the stream.

29. A computerized system comprising:
   a plurality of multimedia play devices, each device receiving and playing data intended for the device; and
   a multimedia read device reading a stream of packets, decoding the packets into data, and sending the data to a corresponding multimedia play device at appropriate times,
   the appropriate times being based on relative timestamps accounting for accumulated time gaps resulting from branches within the stream, wherein the relative timestamps are calculated by the multimedia read device according to the formula:

$$Trel=Tabs-Tacc,$$

where Trel is a relative time, Tabs is an absolute time as discerned from an absolute timestamp from the stream, and Tacc is the accumulated time gaps resulting from branches within the stream.

30. A computerized system comprising:
   a plurality of multimedia play devices, each device receiving and playing data intended for the device; and
   a multimedia read device reading a stream of packets, decoding the packets into data, and sending the data to a corresponding multimedia play device at appropriate times, wherein the appropriate times are based on relative timestamps accounting for accumulated time gaps resulting from branches within the stream, wherein the accumulated time gaps resulting from branches within the stream are calculated by the multimedia read device according to the formula:

$$Tacc=Tacc+(Tabs-Tfrom),$$

where Tacc is the accumulated time gaps resulting from branches within the stream, Tabs is an absolute time as discerned from an absolute timestamp from the stream immediately after a branch, and Tfrom is an absolute time as discerned from an absolute timestamp from the stream at the branch.

31. A computerized system comprising:
   a plurality of multimedia play devices, each device receiving and playing data intended for the device; and
   a multimedia read device reading a stream of packets, decoding the packets into data, and sending the data to a corresponding multimedia play device at appropriate times,
   the appropriate times being based on relative timestamps accounting for accumulated time gaps resulting from branches within the stream, wherein the accumulated time gaps resulting from branches within the stream are calculated by the multimedia read device according to the formula:

$$Tacc=Tacc+(Tnewsegmentbegin-Toldsegmentend),$$

where Tacc is the accumulated time gaps resulting from branches within the stream, Tnewsegmentbegin is an absolute time as discerned from an absolute timestamp from the stream immediately after a branch, and Toldsegmentend is an absolute time as discerned from an absolute timestamp from the stream at the branch.

32. A multimedia read device for reading a stream of packets, each packet having a corresponding substream, comprising:
   a plurality of substream decoders, each substream decoder receiving packets of a corresponding substream, decoding the packets into data and providing the data as output at the appropriate times;
   a demultiplexer receiving packets and sending each packet, including a relative timestamp, to the substream decoder corresponding to the substream of the packet; and
   a stream decoder decoding the stream of the packets, and sending each packet to the demultiplexer with a relative timestamp,
   wherein the appropriate times are based on relative timestamps accounting for accumulated time gaps resulting from branches within the stream, wherein the relative timestamps are calculated by the stream decoder according to the formula:

$$Trel=Tabs-Tacc,$$

where Trel is a relative time, Tabs is an absolute time as discerned from an absolute timestamp from the stream, and Tacc is the accumulated time gaps resulting from branches within the stream.

33. A multimedia read device for reading a stream of packets, each packet having a corresponding substream, comprising:

a plurality of substream decoders, each substream decoder receiving packets of a corresponding substream, decoding the packets into data and providing the data as output at the appropriate times;

a demultiplexer receiving packets and sending each packet, including a relative timestamp, to the substream decoder corresponding to the substream of the packet; and a stream decoder decoding the stream of the packets, and sending each packet to the demultiplexer with a relative timestamp, wherein the appropriate times based on relative timestamps accounting for accumulated time gaps resulting from branches within the stream, wherein the accumulated time gaps resulting from branches within the stream are calculated by the stream decoder according to the formula:

$$T\text{acc}=T\text{acc}+(T\text{abs}-T\text{from}),$$

where Tacc is the accumulated time gaps resulting from branches within the stream, Tabs is an absolute time as discerned from an absolute timestamp from the stream immediately after a branch, and Tfrom is an absolute time as discerned from an absolute timestamp from the stream at the branch.

34. A computer comprising:

a processor;

a computer-readable medium;

a multimedia read device reading a stream of packets, decoding the packets into data, and providing the data as output at the appropriate times;

a program executed by the processor from the medium to maintain the appropriate times based on relative timestamps accounting for accumulated time gaps resulting from branches within the stream, wherein the relative timestamps are calculated by the program according to the formula:

$$T\text{rel}=T\text{abs}-T\text{acc},$$

where Trel is a relative time, Tabs is an absolute time as discerned from an absolute timestamp from the stream, and Tacc is the accumulated time gaps resulting from branches within the stream.

35. A computer comprising:

a processor;

a computer-readable medium;

a multimedia read device reading a stream of packets, decoding the packets into data, and providing the data as output at the appropriate times;

a program executed by the processor from the medium to maintain the appropriate times based on relative timestamps accounting for accumulated time gaps resulting from branches within the stream, wherein the accumulated time gaps resulting from branches within the stream are calculated by the program according to the formula:

$$T\text{acc}=T\text{acc}+(T\text{abs}-T\text{from}),$$

where Tacc is the accumulated time gaps resulting from branches within the stream, Tabs is an absolute time as discerned from an absolute timestamp from the stream immediately after a branch, and Tfrom is an absolute time as discerned from an absolute timestamp from the stream at the branch.

36. A computer-readable medium having a program stored thereon for execution on a suitably equipped computer having a multimedia read device coupled thereto, the device reading a stream of packets, decoding the packets into data, and providing the data as output at the appropriate times, the program maintaining the appropriate times based on relative timestamps accounting for accumulated time gaps resulting from branches within the stream, wherein the relative timestamps are calculated by the program according to the formula:

$$T\text{rel}=T\text{abs}-T\text{acc},$$

where Trel is a relative time, Tabs is an absolute time as discerned from an absolute timestamp from the stream, and Tacc is the accumulated time gaps resulting from branches within the stream.

37. A computer-readable medium having a program stored thereon for execution on a suitably equipped computer having a multimedia read device coupled thereto, the device reading a stream of packets, decoding the packets into data, and providing the data as output at the appropriate times, the program maintaining the appropriate times based on relative timestamps accounting for accumulated time gaps resulting from branches within the stream, wherein the accumulated time gaps resulting from branches within the stream are calculated by the program according to the formula:

$$T\text{acc}=T\text{acc}+(T\text{abs}-T\text{from}),$$

where Tacc is the accumulated time gaps resulting from branches within the stream, Tabs is an absolute time as discerned from an absolute timestamp from the stream immediately after a branch, and Tfrom is an absolute time as discerned from an absolute timestamp from the stream at the branch.

38. A digital video disc player, wherein each packet of a plurality of packets has a corresponding substream, and the digital video disc player comprises:

a plurality of substream decoders, each substream decoder to receive a plurality of packets of a corresponding substream, each packet having a relative timestamp, to decode the packets into data, and to send the data to a corresponding multimedia play device at the relative timestamp;

a demultiplexer to receive packets and send each packet, including a relative timestamp, to the substream decoder corresponding to the substream of the packet; and a decoder to decode the plurality of the packets, calculate accumulated time gaps that result from branches within the plurality of packets for each of the plurality of packets, calculate a relative timestamp that accounts for the accumulated time gaps, and send each packet to the demultiplexer with the corresponding relative timestamp.

39. The digital video disc player of claim 38, wherein the decoder calculates each of the plurality of relative timestamps as a plurality of accumulated time gaps resulting from branches within the plurality of packets subtracted from an absolute timestamp from the plurality of packets.

40. The digital video disc player of claim 38, wherein the accumulated time gaps resulting from branches within the plurality of packets are calculated by the decoder as an absolute time as discerned from an absolute timestamp from the plurality of packets at the branch that is subtracted from the sum of the accumulated time gaps resulting from branches within the plurality of packets and an absolute time as discerned from an absolute timestamp from the plurality of packets immediately after a branch.

41. The digital video disc player of claim 38, wherein the digital video disc player is part of a computer having a processor, a computer-readable random-access memory medium, and another computer-readable medium, wherein a computer program operable to execute on the computer-readable random-access memory medium by the processor of the computer, to calculate the relative timestamp, and send the relative timestamp to the decoder.

42. The digital video disc player of claim 38, wherein the multimedia play device is selected from the group of multimedia play devices comprising: a video display device, and an audio device.

43. The digital video disc player of claim 42, wherein the video display device comprises a monitor.

44. The digital video disc player of claim 42, wherein the audio device comprises an amplifier coupled to at least one speaker.

45. The digital video disc player of claim 38, wherein the digital video disc player is an internal component of a computer.

46. The digital video disc player of claim 38, wherein the digital video disc player is a component within a stereo system.

47. A computer comprising:
   a processor;
   a computer-readable medium;
   a multimedia read device reading a stream of packets, decoding the packets into data, and providing the data as output at the appropriate times; and
   logic on the computer-readable medium and executable by the processor from the computer-readable medium to maintain the appropriate times based on a plurality of relative timestamps in account of a plurality of accumulated time gaps that result from branches within the stream.

48. The computer of claim 47, wherein each of the plurality of relative timestamps are calculated as a plurality of accumulated time gaps resulting from branches within the stream subtracted from an absolute timestamp from the stream.

49. The computer of claim 47, wherein the accumulated time gaps resulting from branches within the stream are calculated by the logic as an absolute time as discerned from an absolute timestamp from the stream at the branch that is subtracted from the sum of the accumulated time gaps resulting from branches within the stream and an absolute time as discerned from an absolute timestamp from the stream immediately after a branch.

50. The computer of claim 47, wherein the computer-readable medium comprises a memory.

51. The computer of claim 47, wherein the multimedia read device comprises a digital video disc (DVD) player.

52. A method for processing a stream of packets, each packet having a corresponding substream, comprising:
   reading a stream of packets;
   decoding the packets into data;
   accounting for accumulated time gaps resulting from branches within the stream;
   determining a plurality of times based on relative timestamps and the accumulated time gaps; and
   sending the data to a corresponding multimedia play device at the plurality of times.

53. The method of claim 52, wherein the stream of packets is read from a digital video disc (DVD).

54. A computer-readable medium having a program stored thereon for execution on a suitably equipped computer having a multimedia read device coupled thereto, the program, when executed, directing the device to perform tasks comprising:
   reading a stream of packets;
   decoding the packets into data;
   accounting for accumulated time gaps resulting from branches within the stream;
   determining a plurality of times based on relative timestamps and the accumulated time gaps; and
   sending the data to a corresponding multimedia play device at the plurality of times.

55. The computer-readable medium of claim 54, wherein each of the plurality of relative timestamps are calculated as a plurality of accumulated time gaps resulting from branches within the stream subtracted from an absolute timestamp from the stream.

56. The computer-readable medium of claim 54, wherein the accumulated time gaps resulting from branches within the stream are calculated as an absolute time as discerned from an absolute timestamp from the stream at the branch that is subtracted from the sum of the accumulated time gaps resulting from branches within the stream and an absolute time as discerned from an absolute timestamp from the stream immediately after a branch.

57. The computer-readable medium of claim 54, wherein the medium is selected from the group of mediums consisting of: a floppy disk, a compact-disc read-only-memory (CD-ROM), and a memory.

* * * * *

UNITED STATES PATENT AND TRADEMARK OFFICE
CERTIFICATE OF CORRECTION

PATENT NO.   : 6,490,405 B1  
DATED        : December 3, 2002  
INVENTOR(S)  : Speed et al.

It is certified that error appears in the above-identified patent and that said Letters Patent is hereby corrected as shown below:

Column 11,
Line 8, replace "device" with -- devices --.

Column 13,
Line 10, replace "Absolute" with -- absolute --.

Signed and Sealed this

Eighth Day of April, 2003

JAMES E. ROGAN
*Director of the United States Patent and Trademark Office*